United States Patent [19]

Kawahara et al.

[11] Patent Number: 5,146,074

[45] Date of Patent: Sep. 8, 1992

[54] SOLID STATE IMAGING DEVICE

[75] Inventors: Yukito Kawahara; Satoshi Machida; Hiroshi Mukainakano; Masahiro Yokomichi, all of Tokyo, Japan

[73] Assignee: Seiko Instruments Inc., Japan

[21] Appl. No.: 741,997

[22] Filed: Aug. 8, 1991

[30] Foreign Application Priority Data

Aug. 18, 1990 [JP] Japan .................... 2-217898

[51] Int. Cl.$^5$ .......................... H01J 40/14
[52] U.S. Cl. ................ 250/208.1; 358/213.11
[58] Field of Search ............... 250/208.1, 211 J; 357/30 H, 30 P; 358/212, 213.11, 213.23, 213.26, 213.27, 213.28, 213.29, 213.31

[56] References Cited

U.S. PATENT DOCUMENTS 4,868,405  9/1989  Nakamura .............. 358/213.11
4,967,067  10/1990  Hashimoto et al. ........ 250/208.1
5,045,686  9/1991  Iwanami et al. .......... 250/208.1

FOREIGN PATENT DOCUMENTS 0253678  1/1988  European Pat. Off. .
0327344  8/1989  European Pat. Off. .

Primary Examiner—David C. Nelms
Assistant Examiner—John R. Lee
Attorney, Agent, or Firm—Bruce L. Adams; Van C. Wilks

[57] ABSTRACT

The solid state imaging device having an array of bit units formed in a semiconductor substrate. Each bit unit is comprised of a phototransistor having a collector formed of the semiconductor substrate an emitter and a base, a switching transistor of the MOS type having a drain connected to the emitter of the phototransistor, an initializing transistor of the MOS type having a drain connected to the base of the phototransistor, a source receptive of a first reference voltage, and a gate connected to the emitter of the phototransistor, and a resetting transistor of the MOS type having a drain connected to the emitter of the phototransistor, a source receptive of a second reference voltage, and a gate receptive of a reset signal. The resetting transistor operates in the reset signal to enable the initializing transistor to initialize the phototransistor. The switching transistor drives the initialized phototransistor to effect reading of image.

3 Claims, 1 Drawing Sheet

SOLID STATE IMAGING DEVICE

BACKGROUND OF THE INVENTION

The present invention relates to a solid state imaging device used for reading of picture elements in a facsimile machine etc., and more particularly relates to improvement in linearity of photoelectric conversion characteristics.

The typical imaging device includes a phototransistor receptive of incident light effective to induce electric charges which are stored in a base region of the phototransistor. The stored charges are read out externally. The conventional solid state imaging device is constructed as follows. Namely, the phototransistor has a base region regularly held in floating state. Its emitter electrode is connected to a resetting MOS transistor, and also connected to a switching MOS transistor for feeding outside a photo-electrically converted signal. These three transistor elements constitute together one bit unit. A plurality of the bit unit are arranged linearly to form a linear image sensor. The linear array of the bit units is sequentially scanned by a controlling circuit provided in the image sensor.

Each of the phototransistors is sequentially returned to an initial state by means of the resetting transistor through the emitter of each phototransistor. Thereafter, electric charges are generated by irradiation of incident light, and are stored in the base region of each phototransistor. After passing a predetermined time interval corresponding to one scanning period, each corresponding switching MOS transistor is sequentially turned on to feed externally from an output terminal through a signal line an electric signal which is obtained by the photoelectric conversion in each phototransistor. In such construction, a light receiving element is composed of the phototransistor which can generate a relatively great output signal due to its amplification function to thereby advantageously increase sensitivity, as compared to another construction where the light receiving element is composed of a photodiode.

However, the phototransistor has normally an optimum operative range to perform linear amplification function when the phototransistor is placed in forward bias condition in which more than a predetermined potential difference is applied between the base and the emitter of the phototransistor. In turn, when the potential difference therebetween is less than the predetermined level, the phototransistor cannot perform sufficient amplification function. Therefore, the conventional image sensor has nonlinear photo-electric conversion characteristics, as a whole, which exhibits the nonlinear relation between the light exposure amount and the output signal voltage magnitude. Namely, the conventional image sensor has relatively low sensitivity characteristics in relatively small light exposure amount range, thereby causing the drawback that a constant sensitivity cannot be ensured throughout the entire range of the light exposure amount.

SUMMARY OF THE INVENTION

Therefore, an object of the present invention is to provide an improved image sensor in which a light receiving element is composed of a phototransistor controlled such as to avoid reduction of the sensitivity in lower light exposure amount range as well as to ensure the constant and high sensitivity throughout the entire light exposure amount range, in order to solve the above noted problem of the prior art.

In order to achieve the above noted object, according to the invention, an initializing MOS transistor is connected to the base region of a phototransistor, which constitutes a light receiving element, so as to apply a reference voltage to the base region. This MOS transistor has a gate electrode connected to the emitter electrode of the phototransistor so as to ensure constant and high sensitivity throughout the entire operative range of the light exposure amount.

In operation of the image sensor as constructed above, the phototransistor is periodically initialized by the above-mentioned MOS transistor such that a potential level of the phototransistor emitter is returned to an initial condition and concurrently a potential level of the phototransistor base is returned to an initial condition, effective to enable the phototransistor to perform sufficient and linear amplification operation. Thereafter, upon irradiation of incident light, photoelectric charges are generated and accumulated in the base region. Since, the potential difference is held between the base and the emitter at a sufficient magnitude effective to ensure the linear amplification operation under even weak exposure condition, the image sensor can ensure the photoelectric conversion characteristics of constant and high sensitivity throughout the entire exposure range in which the image sensor is operated regularly. In this initialized or reset condition, the base potential is set to the initial level and concurrently a forward bias voltage is applied between the base and the emitter. Then, the emitter potential level approaches the base potential level and the above-mentioned MOS transistor is operative to initialize the base and is turned to the nonconductive state to thereby maintain or hold an initial potential difference between the base and the emitter at a given constant and stable magnitude.

DETAILED DESCRIPTION OF EMBODIMENT

Figure 1:
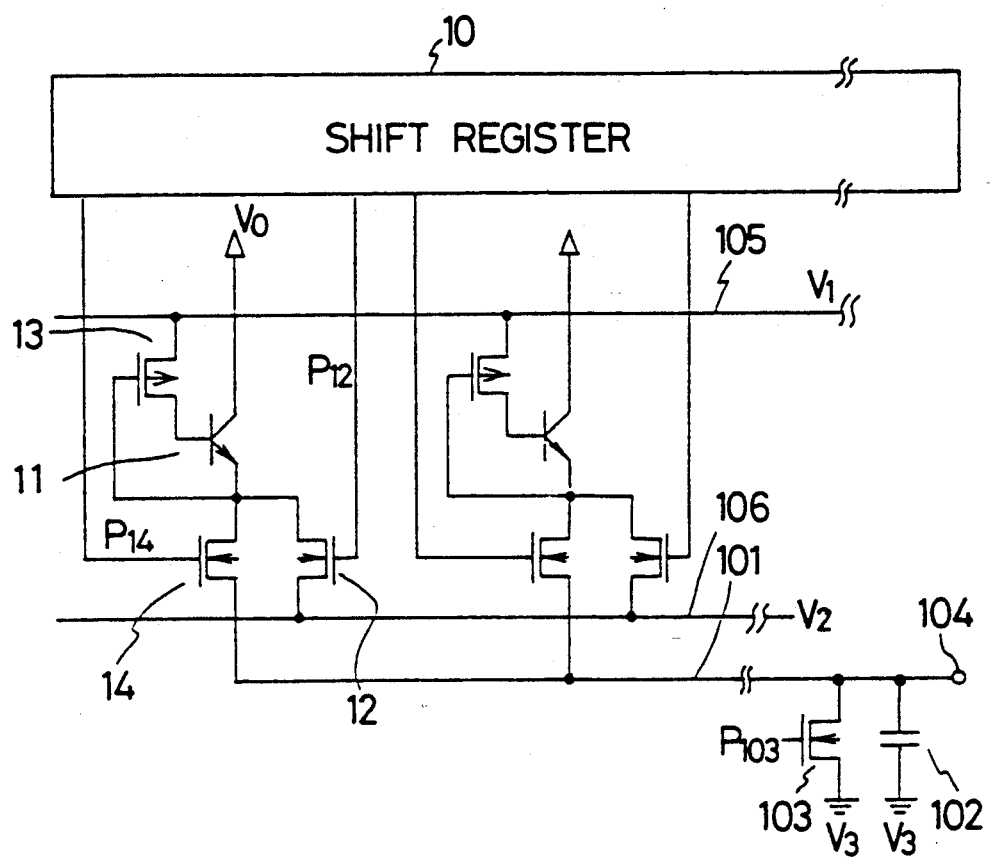
FIG. 1 is a partial circuit diagram of the solid state imaging device according to the invention.
Figure 2:
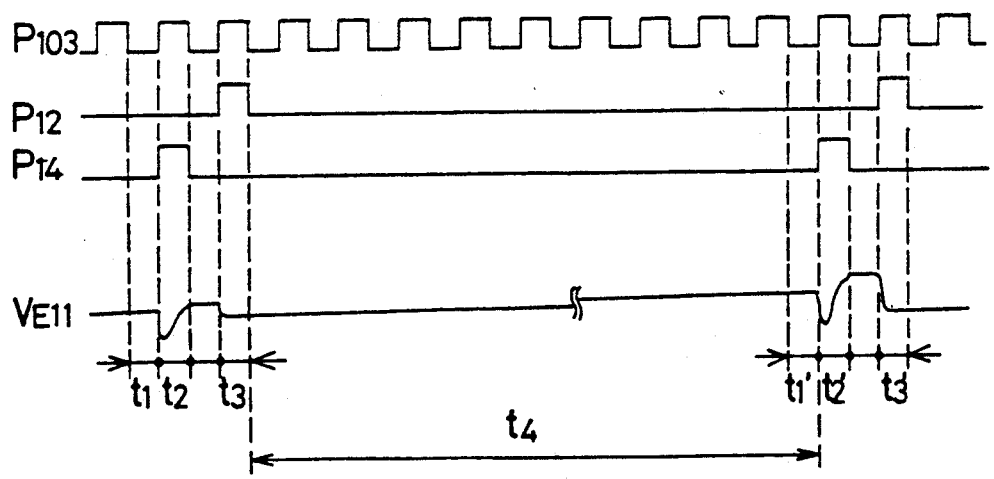
FIG. 2 is a signal waveform diagram illustrative of the operation of the inventive solid state imaging device.

Hereinafter, one embodiment of the inventive solid state imaging device will be described in conjunction with the drawings. FIG. 1 is a partial circuit diagram of one embodiment of the inventive solid state imaging device in the form of a linear image sensor, and FIG. 2 is a signal waveform diagram illustrative of the operation of the linear image sensor.

Referring to FIG. 1, a phototransistor 11 is composed of, for example, a bipolar transistor of the NPN type. The phototransistor 11 has a collector electrode receptive of a substrate voltage Vo of a semiconductor substrate, and an emitter electrode connected to a drain electrode of a resetting transistor 12. The transistor 12 has a source electrode connected to a second reference line 106 to receive therefrom a second reference voltage $V_2$. In this construction, the transistor 12 is composed of, for example, an MOS transistor of the N channel type. The resetting transistor 12 has a gate electrode receptive of a reset pulse $P_{12}$.

An intializing transistor 13 has a drain electrode connected to the base electrode of the phototransistor 11 so as to turn the base region to its initial condition. The transistor 13 is composed of, for example, an MOS transistor of the P channel type. The initializing transistor 13 has a source electrode connected to a first reference line 105 to receive therefrom a first reference voltage $V_1$, and a gate electrode connected to the emitter of the phototransistor 11.

A switching transistor 14 has a drain electrode connected to that emitter of the phototransistor 11. The transistor 14 is composed of, for example, as MOS transistor of the N channel type. The switching transistor 14 has a gate electrode receptive of a selection pulse $P_{14}$, and a source electrode connected to a common signal line 101 so as to feed signal charges through the common signal line 101 to an external load capacitor 102 so that an output signal voltage can be detected across the load capacitor 102. Though the capacitor 102 is utilized as a load to detect the signal voltage in this embodiment, alternatively a resistor can be adopted to effect the voltage detection. A common discharging transistor 103 of the N channel type is connected to periodically discharge the load capacitor 102 in response to a given clock pulse $P_{103}$.

A set of one phototransistor 11 and three MOS transistors 12-14 constitute together one bit unit or one picture element of the photosensor. Photoelectric charges in the form of hold carriers in this case are generated inductively by incident light irradiation, and they are stored in the base region of the phototransistor 11. Photoelectrically converted signal charges are taken externally through the switching transistor 14. A shift register 10 is provided to sequentially feed the reset pulse $P_{12}$ and selection pulse $P_{14}$ so as to scan a linear array of the plural bit units in synchronization with the given clock pulse signal $P_{103}$.

Next, the description is given for the operation of the thus constructed solid state image device in conjunction with FIG. 2. At first during a period $t_1$, the resetting transistor 103 is turned to the conductive state in response to a clock pulse $P_{103}$ to discharge or remove remaining unncessary electric charges which have previously charged in the capacitor 102 so as to hold a potential level of an output terminal 104 at a given third reference voltage $V_3$. Thereafter during a next period $t_2$, the switching transistor 14 is turned to the conductive state in response to the selection pulse $P_{14}$ to drive the phototransistor 11. Consequently, signal charges are fed through the common signal line 101 and accumulated in the load capacitor 102. The signal charges are produced by the amplification operation of the phototransistor 11 proportionally to the photoelectric charges stored in the base region of the phototransistor 11. The signal voltage is detected at the signal output terminal 104. At this period $t_2$, the emitter potential of the phototransistor varies dependently on the light exposure amount. For this, the initializing transistor 13 is provisionally set with a given threshold value $V_{T13}$ effective to avoid turn-on of the transistor 13 which receives a gate voltage identical to the varying emitter potential.

During a following period $t_3$ after the signal charges have been retrieved from the phototransistor, the resetting transistor 12 is turned on in response to the reset pulse $P_{12}$ such that the second reference voltage $V_2$ is applied to set the emitter of the phototransistor 11 to the initial state. This second reference voltage $V_2$ is applied not only to the emitter of the phototransistor 11, but also to the gate electrode of the intitializing transistor 13 so as to turn on the same. When the transistor 13 is turned on, the base potential of the phototransistor 11 instantly approaches the first reference voltage $V_1$ so that an excessive forward bias voltage is applied between the base and emitter of the phototransistor 11. Consequently, the phototransistor 11 starts bipolar operation to fix the emitter potential of the phototransistor 11 so as to balance with an electric current flowing through the resetting transistor 12. The emitter potential may be fixed optimumly such that, for example, more or less 0.6 V of the forward voltage is held between the base and emitter of the phototransistor 11. Such fixed emitter potential is determined by the following approximate relation:

$$K_e V_E (V_0 - V_1 - V_{TN}) = h_{fe} K_n (V_2 - V_E - 0.6 - V_{TP})^2 / 2$$

where $K_e$ denotes K value of the N channel MOS transistor 12, $K_p$ denotes K value of the P channel MOS transistor 13, $V_E$ denotes the emitter potential of the phototransistor 11, $V_{TN}$ denotes the threshold value of the transistor 12, $V_{TP}$ denotes the threshold value of the transistor 13, and $h_{fe}$ denotes emitter follower current amplification factor of the phototransistor 11.

By the operation during the period $t_3$, the phototransistor 11 is placed in the initialized state such that its base and emitter are applied therebetween with the forward voltage sufficient to enable linear amplification operation. After the lapse of the period $t_3$, the resetting transistor 12 is turned off so that the initializing transistor 13 is also turned off to thereby hold or fix a substantially constant potential difference between the base and emitter of the phototransistor 11. While this initialized state is substantially maintained during a subsequent long period $t_4$ which corresponds to a scanning or selecting time interval, the phototransistor receives induced light such that the photoelectrically induced charges in the form of hole carriers are stored in the base region of the phototransistor 11 to raise the base potential $V_{E11}$.

The end of the period $t_4$ is followed by another period $t_1'$ during which the remaining signal charges are removed provisionally from the common signal line 101 and from the load capacitor 102 in manner similar effected during the previous period $t_1$.

Then during a following period $t_2'$ after the lapse of the period $t_1'$, the switching transistor 14 is again made conductive in response to the selection pulse $P_{14}$. Since the common signal line 101 and the load capacitor 102 were held to the initial reference voltage $V_3$ before the period $t_2'$, the fixed forward bias voltage is still applied between the base and the emitter of the phototransistor 11 just when the switching transistor 14 is turned on so that the signal charges amplified according to the electric charges stored in the base region is immediately outputted from the emitter of the transistor 11. The signal charges effects charging of the load capacitor 102 through the switching transistor 14 and the common signal line 101. The charged voltage is detected as a signal voltage at the output terminal 104. As described before, the phototransistor 11 has been reset or initialized during the previous period $t_3$ such that, for example, 0.6 V of the forward bias voltage has been applied between the base and the emitter. Therefore, even under the dark condition where no incident light is irradiated, the phototransistor 11 can output a dark signal during the period $t_2'$ until the forward bias voltage reaches an equilibrium state so as to charge the load capacitor 102. Even under the dark condition where no incident light is irradiated, the phototransistor 11 can operate in a range performing its amplification function, hence the inventive device can output signal charges amplified substantially in proportional to the stored amount of photoelectric charges generated according to the incident light amount even under the dark condition and relatively lower exposure condition.

By repeatedly carrying out the above described sequence of the operation, the light exposure amount received by one receiving element during a given period can be detected and read out periodically in the form of a converted electrical signal. A plurality of the receiving elements are aligned linearly, and are scanned by the shift register 110 with using the selection pulse $P_{14}$ and the reset pulse $P_{12}$, thereby reading image information line-sequentially in the form of the photoelectrically converted voltage.

As described above, according to the invention, the initializing MOS transistor is connected to the base of the phototransistor, and the gate electrode of the initializing MOS transistor is connected to the emitter of the phototransistor. By such simple but efficient construction, there can be obtained the effect that the phototransistor operates as a linear light receiving element to perform the photoelectric conversion function with substantially constant and high sensitivity throughout the entire exposure range.

What is claimed is:
1. A solid state imaging device having an array of bit units formed in a semiconductor substrate, each bit unit comprising:
   a phototransistor having a collector, an emitter and a base formed of the semiconductor substrate;
   a switching transistor of the MOS type having a drain connected to the emitter of the phototransistor;
   an initializing transistor of the MOS type having a drain connected to the base of the phototransistor, a source receptive of a first reference voltage, and a gate connected to the emitter of the phototransistor; and
   a resetting transistor of the MOS type having a drain connected to the emitter of the phototransistor, a source receptive of a second reference voltage, and a gate receptive of a reset signal.

2. A solid state imaging device according to claim 1; including a shift register for applying a reset pulse to the gate of the resetting transistor to drive the initializing transistor to enable the same to initialize the phototransistor.

3. A solid state imaging device according to claim 2; wherein the shift register includes means for applying a selection signal to the switching transistor to enable the same to drive the initialized phototransistor to effect detection of an image.

* * * * *